United States Patent
Engdahl et al.

(10) Patent No.: US 7,166,846 B2
(45) Date of Patent: Jan. 23, 2007

(54) MULTI-PINHOLE COLLIMATION FOR NUCLEAR MEDICAL IMAGING

(75) Inventors: John C. Engdahl, Lake Forest, IL (US); Jinhun Joung, Algunquin, IL (US); Samir Chowdhury, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 10/881,674

(22) Filed: Jun. 30, 2004

(65) Prior Publication Data

US 2006/0000978 A1 Jan. 5, 2006

(51) Int. Cl.
*G21K 1/02* (2006.01)
*G01T 1/202* (2006.01)

(52) U.S. Cl. .................. 250/363.1; 250/370.11
(58) Field of Classification Search ............. 250/363.1; 378/149
See application file for complete search history.

(56) References Cited

U.S. PATENT DOCUMENTS

| | | | | |
|---|---|---|---|---|
| 4,404,469 A | * | 9/1983 | Yin | 250/363.01 |
| 4,521,688 A | * | 6/1985 | Yin | 250/363.04 |
| 4,578,585 A | * | 3/1986 | Gosis et al. | 250/363.08 |
| 5,245,191 A | * | 9/1993 | Barber et al. | 250/363.04 |
| 6,521,894 B1 | * | 2/2003 | Iwanczyk et al. | 250/370.11 |
| 6,671,541 B2 | * | 12/2003 | Bishop et al. | 600/436 |
| 6,710,349 B2 | * | 3/2004 | Shao | 250/363.03 |
| 6,734,430 B2 | * | 5/2004 | Soluri et al. | 250/363.1 |
| 2004/0149923 A1 | * | 8/2004 | Beekman | 250/393 |
| 2004/0232348 A1 | * | 11/2004 | Beekman | 250/393 |
| 2006/0065840 A1 | * | 3/2006 | Joung et al. | 250/363.05 |

OTHER PUBLICATIONS

Rogulski et al. "Ultra-High Resolution Brain SPECT Imaging: Simulation Results." IEEE Transactions on Nuclear Science, vol. 40, No. 4 (Aug. 1993), pp. 1123-1129.*

* cited by examiner

*Primary Examiner*—David Porta
*Assistant Examiner*—Frederick F. Rosenberger

(57) ABSTRACT

A multi-pinhole collimator nuclear medical imaging detector divides a target object space into many non-overlapping areas and projects a minified image of each area onto a segmented detector, where each segment functions as an independent detector or imaging cell. Septa may be provided between the collimator and the detector, to physically isolate the segments.

22 Claims, 3 Drawing Sheets

MULTI-PINHOLE COLLIMATION FOR NUCLEAR MEDICAL IMAGING

BACKGROUND OF THE INVENTION

1. Field of the Invention

The present invention generally relates to nuclear medicine, and systems for obtaining nuclear medical images of a patient's body organs of interest. In particular, the present invention relates to a novel detector configuration for single photon imaging including single photon emission computed tomography (SPECT) and planar imaging.

2. Description of the Background Art

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Single photon imaging, either planar or SPECT, relies on the use of a collimator placed in front of a scintillation crystal or solid state detector, to allow only gamma rays aligned with the holes of the collimator to pass through to the detector, thus inferring the line on which the gamma emission is assumed to have occurred. Single photon imaging techniques require gamma ray detectors that calculate and store both the position of the detected gamma ray and its energy.

Two principal types of collimators have been used in nuclear medical imaging. The predominant type of collimation is the parallel-hole collimator. This type of collimator contains hundreds of parallel holes drilled or etched into a very dense material such as lead. The parallel-hole collimator accepts only photons traveling perpendicular to the scintillator surface, and produces a planar image of the same size as the source object. In general, the resolution of the parallel-hole collimator increases as the holes are made smaller in diameter and longer in length.

The conventional pinhole collimator typically is cone-shaped and has a single small hole drilled in the center of the collimator material. The pinhole collimator generates a magnified image of an object in accordance with its acceptance angle, and is primarily used in studying small organs such as the thyroid or localized objects such as a joint. The pinhole collimator must be placed at a very small distance from the object being imaged in order to achieve acceptable image quality. Pinhole collimators offer the benefit of high magnification of a single object, but lose resolution and sensitivity as the field of view (FOV) gets wider and the object is farther away from the pinhole.

Other known types of collimators include the slant-hole collimator, converging and diverging collimators, and the fan beam collimator. The slant-hole collimator is a variation of the parallel-hole collimator but with all holes slanted at a specific angle. This type of collimator is positioned close to the body and produces an oblique view for better visualization of an organ whose line of sight may be partially blocked by other parts of the body. The converging collimator has holes that are not parallel but instead are focused toward the organ, with the focal point being located in the center of the field of view. The image appears larger at the face of the scintillator using a converging collimator. A diverging collimator results by reversing the direction of the converging collimator. The diverging collimator is typically used to enlarge the FOV, such as would be necessary with a portable camera having a small scintillator. The fan beam collimator is typically used with a rectangular camera head to image smaller organs. The holes are parallel when viewed from one direction and converge when viewed from another direction. The fan beam collimator allows the maximum surface of the crystal to be used to capture imaging data. In most applications, the choice of collimation represents a trade-off between the size of the FOV and the sensitivity and spatial resolution required to properly visualize the target object or organ.

Conventional single photon imaging systems with parallel-hole collimation use large area (on the order of 2000 $cm^2$) monolithic scintillation detectors, and typically have an intrinsic spatial resolution of approximately 3.5 mm FWHM (Full Width Half Maximum). Such detectors are made either of sodium iodide crystals doped with thallium (NaI(Tl)), or cesium iodide (CsI). Scintillations within the NaI crystal caused by absorption of a gamma photon within the crystal, result in the emission of a number of light photons from the crystal. The scintillations are detected by an array of photomultiplier tubes (PMTs) in close optical coupling to the crystal surface.

The intrinsic spatial resolution is primarily determined by the size of the PMTs. The design of the parallel-hole collimator (i.e., the length and diameter of the collimator holes) fixes the system resolution, and represents a trade-off between sensitivity (i.e., the number of detected gamma rays) and spatial resolution (i.e., sharpness of the image) of the imaged target object. The system spatial resolution is a quadrature sum of the geometric resolution of the collimator and the intrinsic resolution of the camera. In most clinical imaging studies, the predominant spatial resolution achieved is determined by the geometric resolution of the collimator, and thus there has not been a strong incentive to increase the intrinsic spatial resolution of the gamma camera.

Conventional commercial gamma cameras are designed to minimize cost by using the largest possible size PMTs, and thus achieve an intrinsic spatial resolution of about 3.5 mm FWHM. However, recent detector technology has enabled the design of small gamma cameras with intrinsic spatial resolution of less than 1 mm FWHM. Thus, there exists a need in the art for improvements in collimator technology to take advantage of such increased intrinsic spatial resolution in the development of new commercial gamma cameras.

SUMMARY OF THE INVENTION

The present invention solves the existing need by providing a new collimator geometry that produces increased sensitivity without sacrificing spatial resolution.

According to one preferred embodiment of the invention, a multi-pinhole collimator detector is provided, which divides the target object space into many non-overlapping areas and projects a minified image of each area onto a segmented detector, where each segment functions as an independent detector.

More specifically, according to one aspect of the invention, a nuclear medical imaging detector is provided, which includes a scintillator that interacts with radiation emanating from a target object being imaged, a pinhole collimator, having one or more pinhole apertures formed therein, provided between the target object and the scintillator, and wherein the distance between the pinhole collimator and the scintillator is selected as a function of the number of pinhole apertures provided in the collimator, such that the one or more pinhole apertures collectively project a unitary minified radiation image of the target object onto said scintillator, and one or more photosensors optically coupled to the scintillator to receive interaction events from the scintillator.

According to another aspect of the invention, a multi-pinhole collimator for a nuclear medical imaging device is provided, wherein the multi-pinhole collimator includes a plurality of pinhole apertures having aperture acceptance angles selected such that each pinhole aperture projects a non-overlapping area of a field of view of a target object being imaged onto a scintillator of the imaging device, so as to collectively project a unitary minified radiation image of the target object onto the scintillator.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1A:
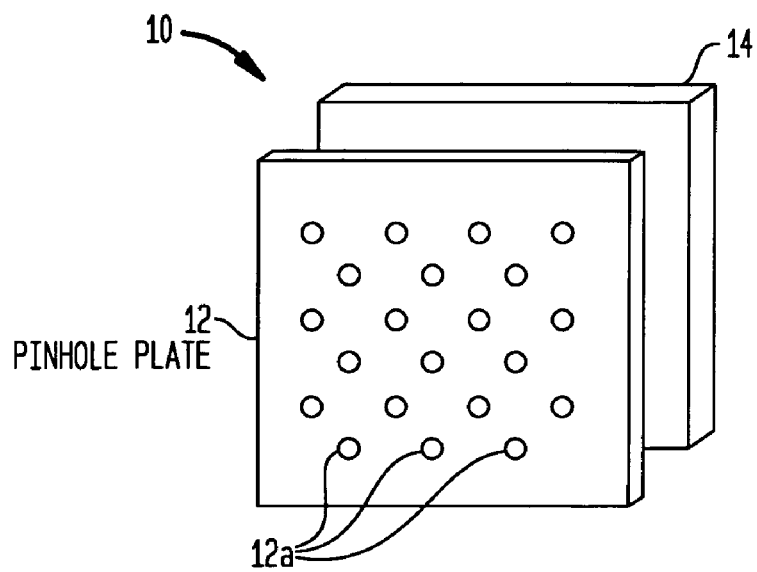
FIG. 1(a) is a perspective view of a multi-pinhole collimator detector according to one preferred embodiment of the invention.

Referring to FIG. 1(a), according to one preferred embodiment of the invention, a multi-pinhole collimator detector 10 includes a pinhole plate 12 spaced apart from a scintillator 14. The pinhole plate 12 contains a number of pinholes 12a formed therein. The pinhole parameters such as pinhole diameter and shape, pinhole collimator material, pinhole arrangement, number of pinholes, focal length and acceptance angle are not fixed, but are determined subject to optimization based on required system performance specifications for the particular system being designed, as will be understood by those skilled in the art.

Figure 1B:
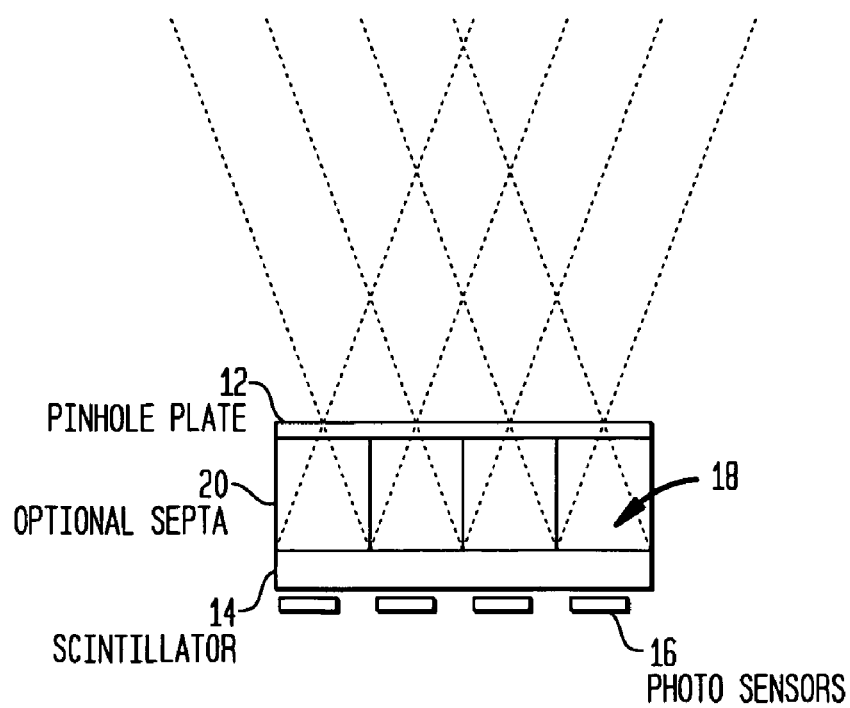
FIG. 1(b) is a cross-sectional view of FIG. 1(a)

FIG. 1(b) is a cross-sectional view of FIG. 1(a) and illustrates multiple conical projections on segmented detector surfaces in segmented detector cells 18, where the conical projections do not overlap each other. Detector segmentation can be achieved by placing septa 20 made of suitable dense material such as lead, etc. between the pinhole plate 12 and the scintillator 14, by appropriately adjusting the pinhole acceptance angle and focal length without septa, or by adjusting the acceptance angle and focal length in addition to providing the septa. The segmented detector cell 18 acts as an independent detector and receives gamma ray projections from the partial volume of a target object. Scintillation interactions with absorbed gamma photons are then detected by photosensors 16, which are provided for each segmented detector cell 18.

The multi-pinhole collimator of the invention allows imaging of large FOVs with relatively small but high-resolution detectors, by minifying images from non-overlapping segments of the target object space and projecting them onto the segmented detector cells 18. This is a significant feature of the invention, which is not present in previously known multi-pinhole or coded aperture solutions.

Figure 2:
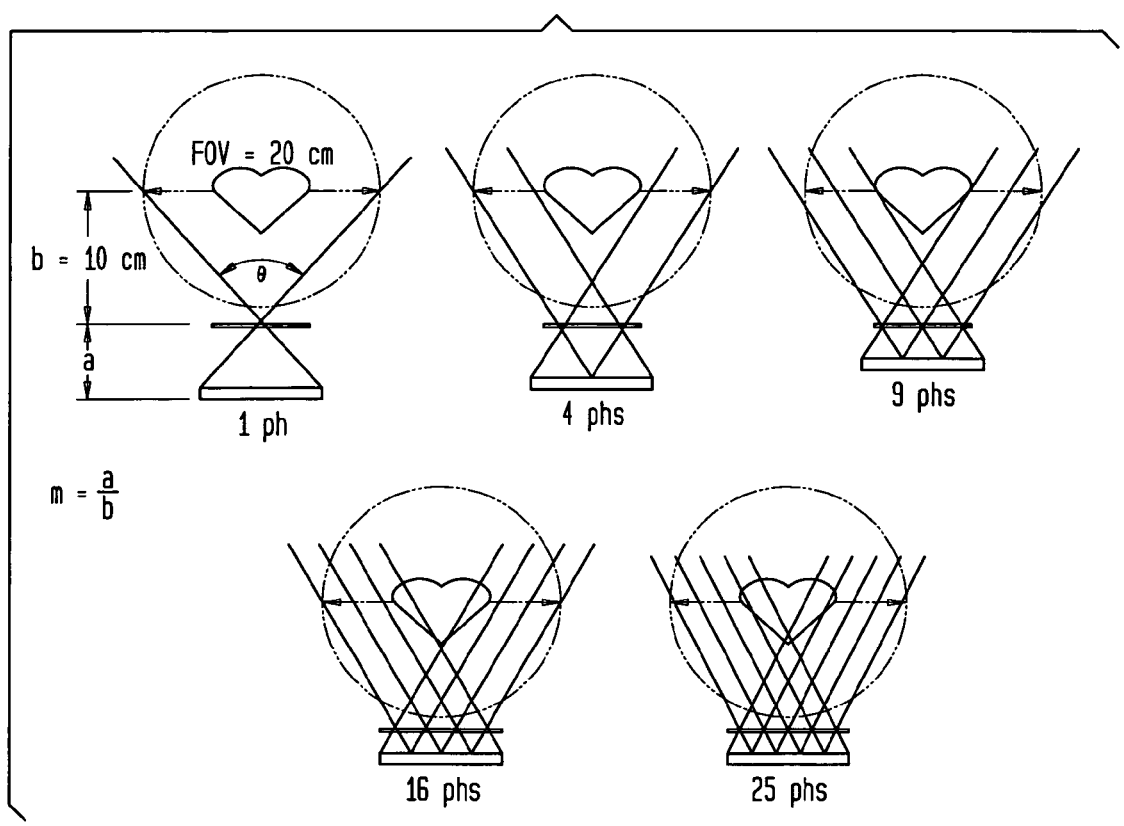
FIG. 2 shows examples of multi-pinhole collimation of gamma photons from a target organ, using varying numbers of pinholes.

FIG. 2 shows examples of the imaging of a 20×20 cm$^2$ FOV (i.e., a total viewing area of $\pi \cdot (10 \text{ cm})^2 \approx 314.15 \text{ cm}^2$) by using a 100 cm$^2$ detector (i.e., a detector with 10 cm length and width) with 1 mm FWHM intrinsic spatial resolution, and a collimator having an array of multiple pinholes. The distance b between the center of the target object and the collimator is fixed at 10 cm, and the pinhole diameter is 1 mm. The number of pinholes determines the important tradeoff between system resolution and sensitivity as summarized in table 1.

TABLE 1

| # PHS | θ (degree) | a (cm) | area (cm2) | Mag | Rs (mm) | efficiency |
|---|---|---|---|---|---|---|
| 1 | 90 | 5.0 | 100 | 0.5 | 3.6 | 1.0 |
| 4 | 73 | 3.4 | 25 | 0.34 | 4.9 | 4.6 |
| 9 | 67 | 2.5 | 11.1 | 0.25 | 6.4 | 8.6 |
| 16 | 64 | 2.0 | 6.25 | 0.2 | 7.8 | 12.1 |
| 25 | 62 | 1.7 | 4 | 0.17 | 9.1 | 14.4 |

As shown, for a collimator with one pinhole, the acceptance angle θ is 90 degrees and the focal length a is set to 5.0 cm, providing a magnification m =a/b=0.5. While this configuration provides a spatial resolution of 3.6 mm, the sensitivity or efficiency is only 1.0. As the number of pinholes is increased, the efficiency goes up, but the resolution becomes worse. For each configuration, the entire area of the detector is used, being segmented into separate imaging cells each receiving a non-overlapping partial volume of the target object FOV.

The acceptance angle of the pinhole aperture plays a key role in determining several system performance factors such as spatial resolution, sensitivity, penetration and FOV coverage.

Figure 3A:
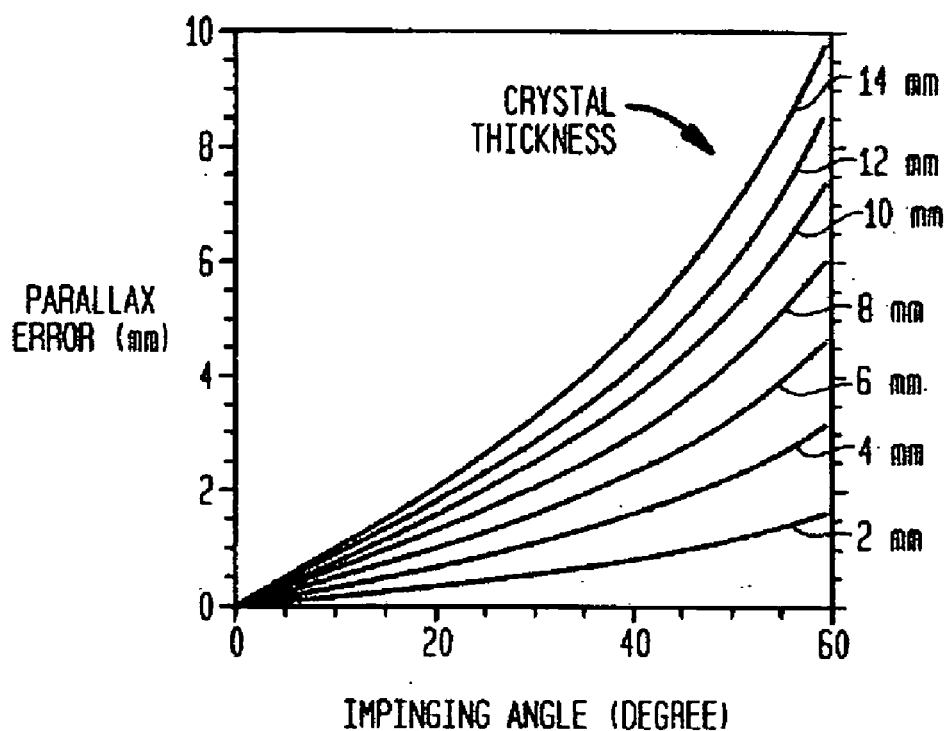
FIG. 3(a) is a graph illustrating parallax error as a function of incident impinging angle, scintillator thickness and acceptance angle.
Figure 3B:
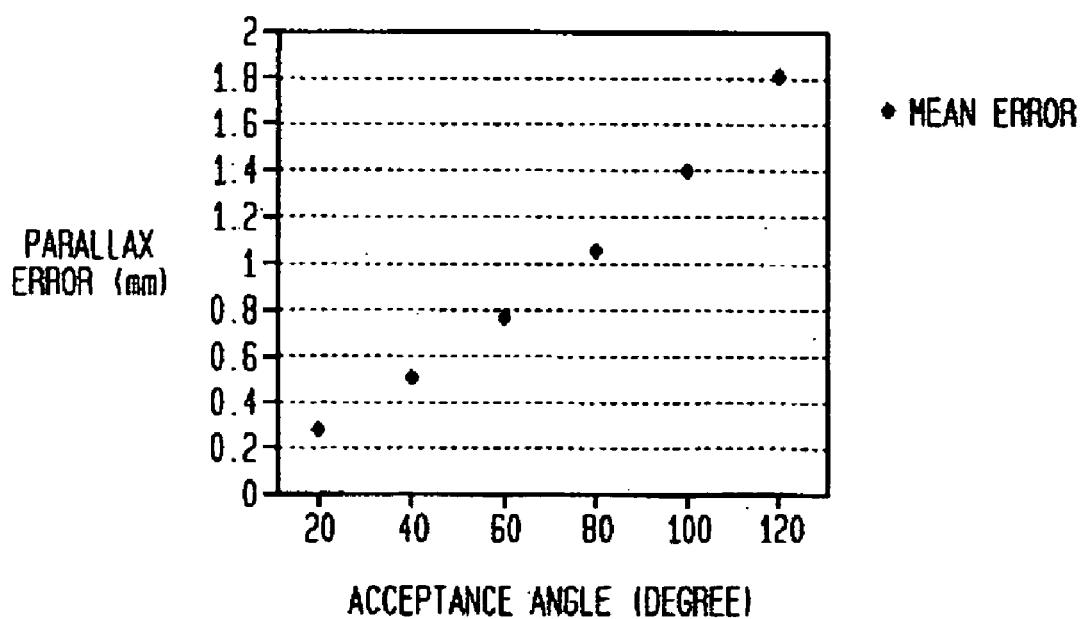
FIG. 3(b) is a graph illustrating the mean parallax error as a function of acceptance angle.

There is significant loss of resolution when a gamma ray impinges on a pinhole aperture at an oblique angle as a result of the depth of interaction (DOI) effect. FIG. 3 shows the theoretical analysis of parallax error for a CsI(Tl) scintillator interacting with 150 KeV gamma photons based on equations (1) and (2) below. FIG. 3(a) shows parallax error as a function of gamma ray incident angle/crystal thickness. The mean parallax error as a function of acceptance angle is shown in FIG. 3(b), where a 6 mm thick CsI(Tl) scintillator interacting with 150 KeV gamma photons was considered.

$$\varepsilon(\theta) = \frac{1}{T} \int_0^T e^{-\mu t \tan(\theta)} dt \qquad (1)$$

$$E[\varepsilon(\theta)] = \frac{1}{2\alpha} \frac{1}{T} \int_{-\alpha}^{\alpha} \int_0^T e^{-\mu t \tan(\theta)} dt\, d\theta \qquad (2)$$

Where, θ is the angle of incidence relative to the normal, T is the thickness of the scintillator, μ is the mass attenuation coefficient for a given scintillator with a given gamma photon energy, and 2α is the acceptance angle of the pinhole.

For pinhole collimation systems using conventional gamma cameras, the DOI effects are negligible because they are overwhelmed by the relatively poor spatial resolution.

However, for high resolution detectors, i.e., intrinsic spatial resolution of 2 mm or better (lower), including solid state detectors, position sensitive PMTs (PSPMTs) or photo diode array-coupled scintillator detectors, the parallax error effect on image quality becomes critical.

A second factor that affects spatial resolution is the penetration component of gamma rays that pass through the collimator material near the pinhole aperture. As acceptance angle increases, the path length for penetration through the collimator material lengthens, thereby decreasing the probability of transmission. In addition, as demonstrated by *Investigation of Spatial Resolution and Efficiency Using Pinholes with Small Pinhole Angle*, M. B. Williams, A. V. Stolin and B. K. Kundu, IEEE TNS/MIC 2002, incorporated herein by reference in its entirety, for the small acceptance angle pinhole, the non-penetration component predominates over the penetration component (i.e., the sum of those gamma rays passing through the pinhole aperture) over the entire FOV, whereas for the large acceptance angle pinhole, the penetration component predominates over the non-penetration component.

The novel multi-pinhole collimator according to the present invention, with the features of segmentation of the detection surface area of the photodetector and non-overlapping partial volume projection limits the acceptance angle by design and thereby minimizes DOI error and penetration effects.

Alternatively, a curved scintillator plate can be used to eliminate DOI issues if appropriate methods of coupling photo sensors to the curved plate are utilized.

In summary, the novel multi-pinhole collimator detector according to the invention provides a high-resolution detector that is segmented into a number of small, independent imaging cells, each associated with a separate photodetector. Each segmented cell receives a conical projection of a non-overlapping partial FOV volume of a target object. The non-overlapping areas are provided by using dense material septa, and/or appropriately adjusting the acceptance angle and focal length of the pinhole apertures. Specific design parameters such as, e.g., pinhole diameter, length, shape, arrangement, number, focal length, acceptance angle and collimator material, will be determined by the design engineer based on the specifics of the system performance parameters of the system being designed.

The invention having been described, it will be apparent to those skilled in the art that the same may be varied in many ways without departing from the spirit and scope of the invention. Any and all such modifications are intended to be included within the scope of the following claims.

What is claimed is:

1. A nuclear medical imaging detector, comprising:
    a scintillator that interacts with radiation emanating from a target object being imaged;
    a pinhole collimator, having one or more pinhole apertures formed therein, provided between said target object and said scintillator, and wherein the distance between the pinhole collimator and the scintillator is selected as a function of the number of pinhole apertures provided in said collimator, such that said one or more pinhole apertures collectively project a unitary minified radiation image of said target object onto said scintillator; and
    one or more photosensors optically coupled to said scintillator to receive interaction events from said scintillator.

2. The imaging detector of claim 1, wherein said one or more photosensors comprises one or more solid state photosensor devices.

3. The imaging detector of claim 1, wherein said one or more photosensors comprises one or more position-sensitive photomultiplier tubes.

4. The imaging detector of claim 1, wherein said one or more photosensors comprises one or more photodiodes.

5. The imaging detector of claim 1, wherein said pinhole collimator includes at least two pinhole apertures, each of which projects a partial non-overlapping area from a field of view of said target object onto a different non-overlapping area of said scintillator.

6. The imaging detector of claim 5, wherein said detector further comprises at least one septum physically separating said different areas of said scintillator.

7. The imaging detector of claim 5, wherein the projection area of each of said pinhole apertures is determined in accordance with a preselected distance between the pinhole collimator and the scintillator.

8. The imaging detector of claim 5, wherein the projection area of each of said pinhole apertures is determined in accordance with a preselected pinhole aperture acceptance angle.

9. A multi-pinhole collimator for a nuclear medical imaging device, wherein said multi-pinhole collimator includes a plurality of pinhole apertures having aperture acceptance angles selected such that each pinhole aperture projects a non-overlapping area of a field of view of a target object being imaged onto a scintillator of said imaging device, so as to collectively project a unitary minified radiation image of said target object onto said scintillator.

10. A nuclear medical imaging detector, comprising:
    a scintillator that interacts with radiation emanating from a target object being imaged;
    a pinhole collimator, having a plurality of pinhole apertures formed therein, provided between said target object and said scintillator, and wherein aperture acceptance angles of said pinhole apertures are selected as a function of the number of pinholes provided in said collimator, such that said plurality of pinholes collectively project a unitary minified radiation image of said target object onto said scintillator; and
    one or more photosensors optically coupled to said scintillator to receive interaction events from said scintillator.

11. The imaging detector of claim 10, wherein said one or more photosensors comprises one or more solid state photosensor devices.

12. The imaging detector of claim 10, wherein said one or more photosensors comprises one or more position-sensitive photomultiplier tubes.

13. The imaging detector of claim 10, wherein said one or more photosensors comprises one or more photodiodes.

14. The imaging detector of claim 10, wherein said pinhole collimator includes at least four pinhole apertures, each of which projects a partial non-overlapping area from a field of view of said target object onto a different non-overlapping area of said scintillator.

15. The imaging detector of claim 14, wherein said detector further comprises at least two septa physically separating said different areas of said scintillator.

16. The imaging detector of claim 14, wherein the projection area of each of said pinhole apertures is determined in accordance with a preselected distance between the pinhole collimator and the scintillator.

17. A nuclear medical imaging detector, comprising:

a scintillator that interacts with radiation emanating from a target object being imaged;

a pinhole collimator, having a plurality of pinhole apertures formed therein, provided between said target object and said scintillator;

septa provided between said pinhole collimator and said scintillator to divide said scintillator into a plurality of independent imaging cells, such that each of said plurality of pinhole apertures is positioned at a midpoint between two adjacent septa and projects a radiation image of a different portion of said target object onto a different imaging cell of said scintillator; and one or more photosensors optically coupled to said scintillator to receive interaction events from said imaging cells.

18. The imaging detector of claim 17, wherein said one or more photosensors comprises one or more solid state photosensor devices.

19. The imaging detector of claim 17, wherein said one or more photosensors comprises one or more position-sensitive photomultiplier tubes.

20. The imaging detector of claim 17, wherein said one or more photosensors comprises one or more photodiodes.

21. The imaging detector of claim 17, wherein the projection area of each of said pinhole apertures is further determined in accordance with a preselected distance between the pinhole collimator and the scintillator.

22. The imaging detector of claim 17, wherein the projection area of each of said pinhole apertures is further determined in accordance with a preselected pinhole aperture acceptance angle.

* * * * *